July 8, 1947.  R. L. HALLMAN  2,423,698
STRIP WORKING APPARATUS
Filed Sept. 12, 1944  3 Sheets-Sheet 1
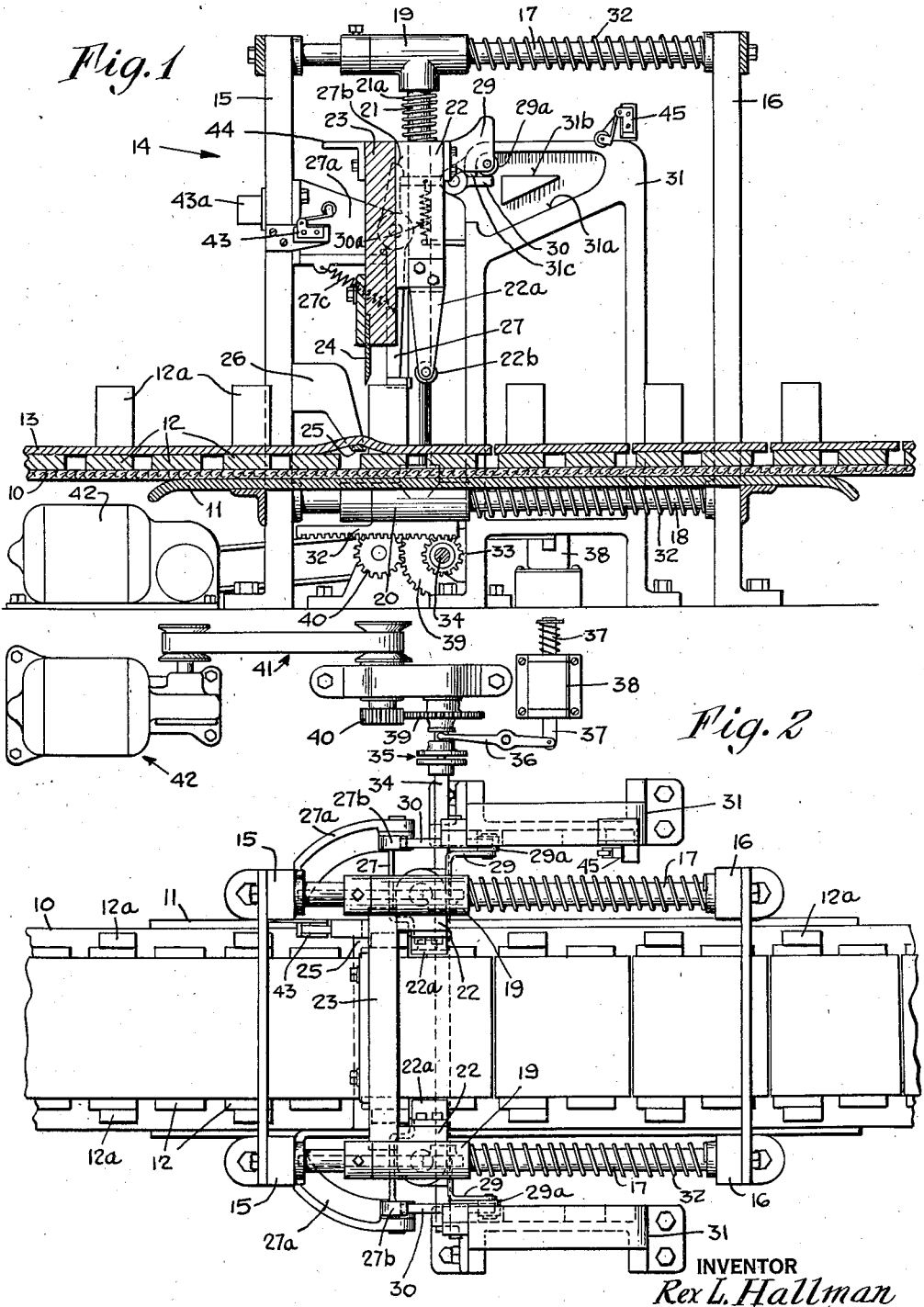
INVENTOR
Rex L. Hallman
BY Johnson & Kline
ATTORNEYS July 8, 1947.  R. L. HALLMAN  2,423,698
STRIP WORKING APPARATUS
Filed Sept. 12, 1944  3 Sheets-Sheet 2

INVENTOR
Rex L. Hallman
BY Johnson + Kline
ATTORNEYS

July 8, 1947.    R. L. HALLMAN    2,423,698
STRIP WORKING APPARATUS
Filed Sept. 12, 1944    3 Sheets-Sheet 3
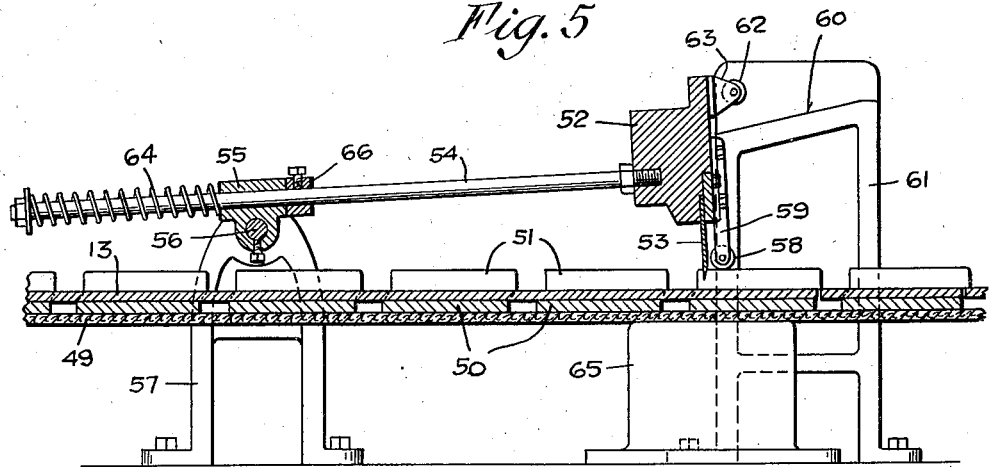
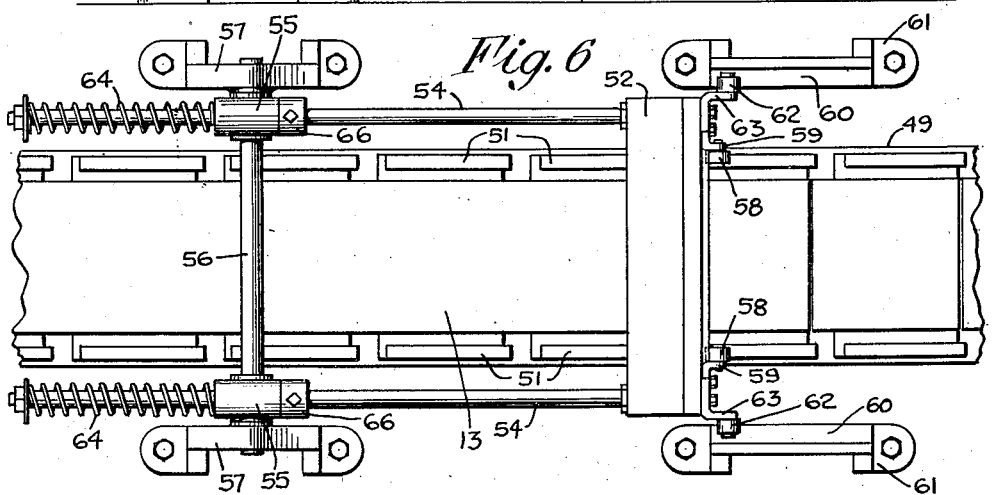
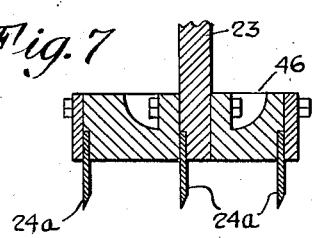
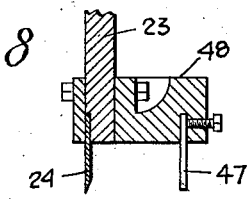
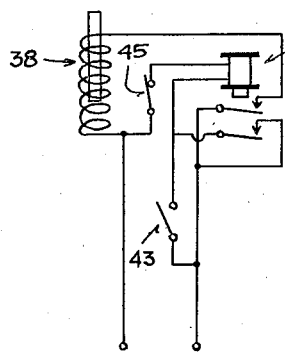
INVENTOR
Rex L. Hallman
BY Johnson & Kline
ATTORNEYS Patented July 8, 1947

2,423,698

UNITED STATES PATENT OFFICE 2,423,698

STRIP WORKING APPARATUS

Rex L. Hallman, Milford, Conn., assignor of thirty per cent to John W. Hallman, Devon, Conn.

Application September 12, 1944, Serial No. 553,785

19 Claims. (Cl. 164—48)

This invention relates to apparatus for performing operations on continuous strip material, and more particularly to a machine for cutting, punching, imprinting or otherwise altering a continuous strip of material while the latter is emerging from a source of supply.

An object of the present invention is to provide a simple automatic machine which is positive in operation, for working long continuous strip material. This is accomplished by a combination of conveyor mechanism and tool mechanism arranged to cooperate in a novel manner so that the handling and working of the strip material is done simultaneously, the working or altering of the strip being carried out by repeating or sequentially occurring operation of the tool mechanism, the latter being controlled by the conveyor mechanism in a manner that perfect synchronism between the two is always assured. The conveyor mechanism also cooperates with the tool mechanism to provide a supporting or platen means for enabling such operations as shearing, punching and the like to be carried out while the strip material is in motion. Thus a continuous supply of material emerging from a rolling mill, extruding die or the like may be handled and worked on before its final disposition without extra handling operations, or additional time being required.

In the embodiments of the invention illustrated herein, the conveying mechanism includes a conveyor belt which is provided with spaced blocks on which the strip material is supported. The blocks have arms for operating a carriage carrying a knife so that the latter is caused to periodically cut the strip, travel with it, and then return to an initial starting position, the cycle being maintained in synchronism with the movement and location of the blocks on the conveyor belt. By spacing the blocks uniformly and adjusting the speed of the conveyor so that it approximates that of the strip emerging from the source of supply, a close control of the severing of the strip may be obtained.

According to one specific form of the invention the blocks on the conveyor belt have side extensions which function as track segments, which support the carriage and knife during portions of the conveyor movement. The carriage is pivotally and slidably mounted so that it may move substantially vertically as well as travel in the direction of the conveyor movement. The arrangement is such that when the ends of one set of track segments are reached the carriage will drop, causing the knife to sever a section of the strip material, the carriage then travelling with the conveyor and strip and being automatically raised during such travel by separate inclined track means to cause the knife to become disengaged from the strip. Thereupon the carriage is supported by the next set of track segments and automatically returned by spring means to its initial starting position in readiness for repeating the cutting operation, and the severed section of the strip material is carried off by the conveyor to a take-off point. The knife and carriage are therefore actuated by the conveyor, so that synchronism of the carriage and conveyor mechanism is obtained. If desired, a plurality of knives may be mounted in tandem on the carriage to sever more than one section of the strip during each cycle of carriage movement, or a knife and punch or imprinting device may be arranged to operate conjointly on the strip.

In another specific form of the invention, the blocks of the conveyor are provided with tripping arms adapted to operate latches for releasing the knife and carriage for severing the strip. In this form, the carriage is mounted on vertical and horizontal pairs of parallel slides arranged to provide free and unbinding movement, the carriage and knife travelling with the conveyor and strip after they have dropped to sever a section of the latter, and raising automatically by means of stationary inclined tracks during such travel to disengage the knife from the strip. The return of the carriage to its initial position is accomplished by spring means and stationary horizontal tracks on which latter the carriage travels in an elevated position. According to this form of the invention the tripping blocks may be conveniently repositioned in different locations on the conveyor belt to change the length of sections severed from the continuous strip of material.

Where a comparatively heavy machine structure is required to perform heavier operations, an additional power drive for the carriage is also provided, separate from the conveyor system, for causing the carriage when in dropped position to travel with the conveyor belt at substantially the speed of the latter. The operation of this separate power drive is automatic, being controlled in a novel manner by the conveyor, so that the synchronism between the conveyor platen mechanism and cycles of operation of the carriage is maintained. Also in this specific form of the invention, a shear bar is provided, interposed between the strip supporting structure of the conveyor and the strip material being carried thereby at the point where the cutting knife severs the strip material, the bar cooperating with the knife to provide a closely controllable shearing action.

Other features and advantages will hereinafter appear.

In the accompanying drawings—

Figure 1 is an axial vertical section of a machine, illustrating one form of the invention.

Fig. 2 is a top or plan view of the machine of Fig. 1.

Fig. 5 is an axial vertical section of a machine, illustrating another form of the invention.

Fig. 6 is a top or plan view of the machine of Fig. 5.

Fig. 7 is a fragmentary sectional view illustrating a carrier for three knives mounted in tandem.

Fig. 8 is a fragmentary sectional view showing a carrier mounting a knife and punch for conjoint operation, and Fig. 9 is a circuit diagram of the control system for the carriage power drive.

Figure 3:
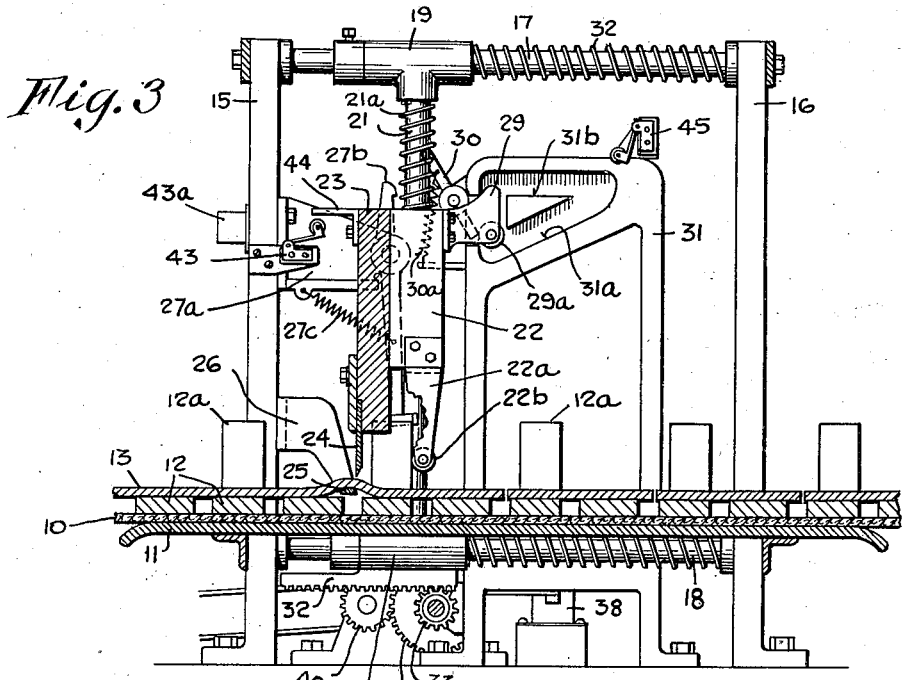
Fig. 3 is a view similar to Fig. 1, but showing the cutting knife released and about to sever the strip material.
Figure 4:
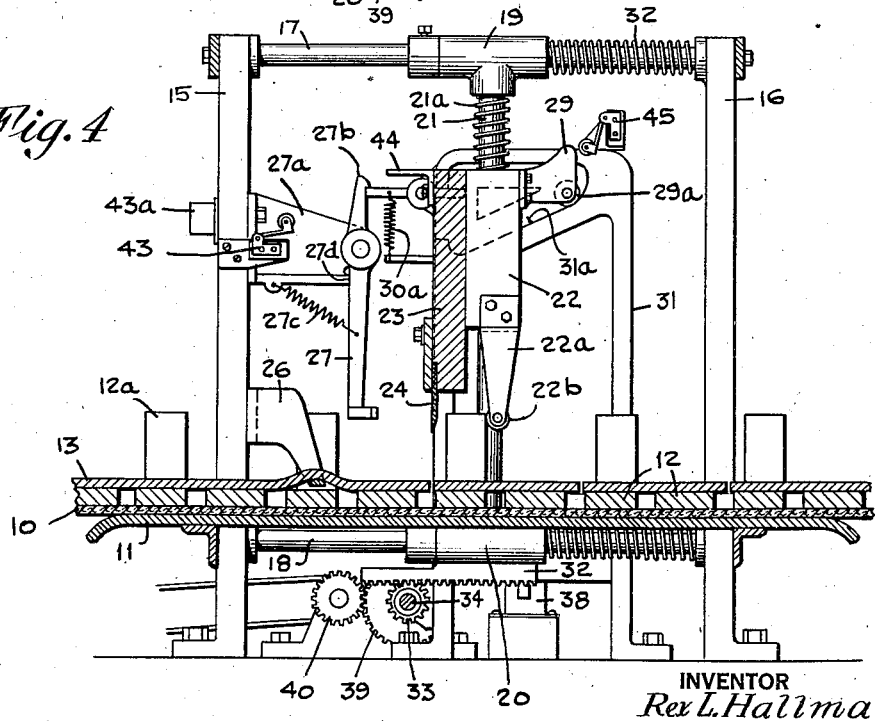
Fig. 4 is a view similar to Fig. 3, but with the knife separated from the strip after severing same.

The machine illustrated in Figs. 1 through 4 comprises an endless conveyor belt 10 which may be of canvas, woven wire mesh or other suitable material travelling generally in a horizontal direction from left to right and being supported along at least a part of its length by a conveyor slider bed 11. The belt 10 has fastened thereto a plurality of spaced blocks 12, which may be secured to the belt by suitable bolts or brackets (not shown); the blocks serving as a supporting surface for a continuous strip of material 13 which may be of plastic, impregnated cloth, metal or the like. The strip material 13 is fed to the conveyor belt 10 from a source of supply (not shown) which may be a rolling mill, extruding die, or supply roll, the weight of the strip on the conveyor providing sufficient friction at the surfaces of the blocks 12 so that the strip will travel with the conveyor belt with substantially no slippage, the speed of the belt 10 being adjusted to approximately equal the speed of emergence of the strip 13 from its supply.

For cooperation with the conveyor belt 10 and blocks 12, a tool control mechanism 14 is provided having a framework comprising pairs of stationary forward uprights 15 and rear uprights 16, the uprights of each pair being disposed on opposite sides of the belt 10. The uprights 15 and 16 are connected together by pairs of horizontal slide bars 17 and 18, which slidably carry fittings 19 and 20 respectively. The fittings 19 and 20 at each side of the conveyor belt 10 are respectively connected together by vertical slide bars 21, which carry sleeve 22 secured to opposite sides of a gate or carriage 23. According to this construction, the carriage 23 may be moved between limits vertically, and also horizontally along the direction of the movement.

For the purpose of severing the strip 13 into sections, the carriage 23 is provided with a downwardly extended knife 24 adapted to span the strip 13 and sever the latter when the carriage is dropped from an initial raised position. For cooperation with the knife 24 a shear bar 25 is provided, mounted by means of brackets 26 on the forward uprights 15, the bar extending between the strip 13 and the blocks 12 of the conveyor belt adjacent the point where the knife 24 severs the strip.

To provide for automatic synchronized operation of the carriage 23 and knife 24 in response to movement of the conveyor belt 10, certain of the blocks 12 at equally spaced intervals along the belt have upwardly extending arms 12a, and latches 27 mounted on brackets 27a secured to the uprights 15 are provided, to be operated by the arms 12a.

As shown in Fig. 1, the carriage sleeves 22 have brackets 29 secured thereto, carrying rollers 29a, the latter being supported at the ends of levers 30 which are pivotally mounted on stationary frames 31. The other ends of the levers 30 are engaged by the upper hooked ends 27b of the latches 27, so that the levers are normally maintained horizontal and are prevented from clockwise turning movement. However, when the latches 27 are operated to move counterclockwise in response to movement of the belt 10 from left to right, the upper hooked ends 27b of the latches will become disengaged from the levers 30 so that the latter are released, and as a result of the weight and pressure of the carriage 23 the ends of the levers will be pushed aside and the carriage will drop and cause the knife 24 to sever a section of the strip 13, Figs. 3 and 4.

To cause the carriage and knife to travel with the conveyor belt 10 and strip 13 after a section of the latter has been severed, the sleeves 22 are provided with arms 22a having rollers 22b which are engaged by the arms 12a of the conveyor. Thus after the carriage 23 has been dropped, it will be caused to travel with the conveyor belt 10 and strip 13 due to the driving force exerted on the arms 22a by the arms 12a, Fig. 4. Also, the stationary frames 31 are provided with inclined tracks 31a for engagement with the rollers 29a so that when the carriage 23 is travelling with the conveyor it will be automatically raised to a position wherein the rollers 22b clear the arms 12a driving the carriage. During this raising movement the knife 24 will become disengaged from the strip 13. Upon the rollers 22b clearing the arms 12a, the carriage 23 will be free to return to its initial or starting position. This return is accomplished by coil springs 32 carried by the horizontal slide bars 17 and 18. At the beginning of the return movement of the carriage 23 the rollers 22b will ride on the top surfaces of the arms 12a for an extent, until the rollers 29a engage horizontal tracks 31b carried by the frames 31. Thereupon, the carriage 23 will be supported by the tracks 31b until it reaches its initial or starting position, wherein its support will again be assumed by the ends of the levers 30, which latter have been automatically returned to their normal horizontal positions by coil springs 30a, and latched in said positions by the latches 27. The horizontal positions of the levers 30 are determined by engagement of the latter with abutment portions 31c of the frames 31, which portions serve as stops against which the springs 30a normally hold the levers. Also, coil springs 27c are provided for restoring the latches 27 to their normal vertical positions shown in Fig. 1, the latches when vertical engaging abutment portions 27d of the brackets 27a.

To charge, or supply an initial impetus to, the carriage 23, compression springs 21a may be provided on the vertical slide bars 21, if such impetus is desired for heavier operations. Otherwise, the weight of the carriage 23 may be sufficient for lighter operations, to cause the knife 24 to completely sever the strip 13. By the provision of the inclined tracks 31a the carriage 23 and knife 24 will be raised comparatively slowly after severance of the strip 13 so that likelihood of the cut portions of the strip raising with the knife are minimized.

According to the above construction, the conveying and knife operating mechanisms of the machine co-function in carrying the strip 13 from its source of supply and automatically severing the strip into sections while it is moving. Each time a pair of latch tripping arms 12a engage the latches 27, the latter will be caused to release the supporting levers 30, thereby permitting the carriage 23 and knife 24 to drop and sever a section of the strip 13. In severing the strip 13, the knife 24 may cooperate with the shear bar 25, which latter may be adjustably mounted to permit close control of the shearing action. It will be noted that the sharp edge of the knife 24 may extend into the space between two adjacent blocks 12 of the belt each time the latches 27 are operated, since the location of the spaces between adjacent blocks 12 has a definite and fixed relation with respect to the latch tripping arms 12a. After descent of the carriage 23, it will be caused to travel with the conveyor belt 10 and blocks 12a under power supplied by the belt and transmitted through the arms 12a and 22a, the carriage meanwhile being automatically raised by the inclined tracks 31a, and when a predetermined intermediate position is reached the carriage will be automatically returned to its initial starting position.

It may be desired to gear the vertical slide bars 21 together to insure their moving simultaneously without binding, and for this purpose the lower fittings 20 may be provided with racks 32 engaging pinions 33 rigidly carried on a common shaft 34 journaled on the stationary frame 31. Thus, slight inequalities of pressure exerted on the horizontally movable structure comprising the fittings 19, 20, and the bars 21, as a result of slight misalignment of the arms 12a, or of variations in the springs 32 will not cause binding of the slides.

Where heavy operations are to be performed, as on a strip 13 of substantial thickness or toughness which necessitates a strong and heavy carriage and slide structure therefor, the inertia of the parts might be sufficiently great to impose a considerable load on the conveyor belt 10 when the latter is at the point of picking up and travelling the carriage 23. Therefore, according to the present invention and referring to Fig. 2, a separate power drive means is provided for travelling the carriage and associated slide structure without requiring driving energy from the conveyor.

As shown, the shaft 34 is connected with a clutch 35 operated by a lever 36 and plunger 37 of a solenoid 38. The clutch 35 is rotatably driven by a gear 39 meshing with a pinion 40 in turn driven by a variable speed transmission 41 powered from a gearhead electric motor 42. The solenoid 38 is connected in circuit with a normally-open limit switch 43 and relay 43a, Figs. 1, 2 and 9, the switch being operated by an arm 44 mounted on the carriage 23 to close the solenoid circuit when the carriage is dropped. When the solenoid and relay are energized, the clutch 35 is operated to become engaged, whereupon the motor 42, which may be running continuously, drives the shaft 34 and causes the carriage 23 to travel with the conveyor belt 10 and strip 13, the speed of travel of the carriage being made to approximate that of the belt by suitable adjustment of the variable speed transmission 41.

When the carriage during its travel has been raised to the intermediate position wherein the rollers 22b clear the arms 12a, the solenoid 38 is made to release the clutch 35. This is accomplished by the provision of a normally-closed limit switch 45 in the relay circuit, the switch being shown as carried by the frame 31 and operable by the bracket 29. When the switch 45 is operated, the solenoid is deenergized, and the clutch disengaged, whereupon the carriage 23 will be free for return by the compression springs 32 to its initial or starting position.

Referring to Fig. 7, if desired the carriage 23 may be provided with a plurality of knives 24a mounted in a holder 46 which may be secured to the carriage 23 by screws as shown or other suitable means. The spacing between the knives 24a is such that the knives may simultaneously enter spaces between the blocks 12, so that the strip 13 may be severed into a plurality of sections during a single cycle of the carriage mechanism. A plurality of shear bars 25 may be provided, one for each knife 24a, or the shear bars may be dispensed with where the material of the strip 13 permits. If desired, as shown in Fig. 8, the carriage 23 may be provided with a knife 24 and a punch 47 mounted in a carrier 48, so that the strip 13 may be severed and also perforated simultaneously. Or the punch 47 may be replaced by a stamping tool so that impressions may be imprinted on the strip 13 simultaneously with the performance of other operations.

A modification of the apparatus of the present invention is shown in Figs. 5 and 6. A conveyor belt 49 is provided with a plurality of spaced blocks 50, each of which carries individual spaced track segments 51. A comparatively heavy carriage 52 mounting a knife 53 is carried by a pair of parallel bars 54, which latter are slidable in fittings 55 rotatably mounted on a transverse bar 56 carried by standards 57 at each side of the belt 49. The carriage 52 is thus mounted so that it may move substantially vertically with respect to the belt 49, and also travel horizontally with the latter after the knife 53 has severed a section of the strip 13. Normally, the carriage 52 is maintained in a raised or starting position by means of rollers 58 carried by brackets 59 secured to the carriage 52, the rollers riding on the track segments 51. As the conveyor belt 49 moves from left to right, at intervals the rollers 58 are no longer supported, where they leave one set of segments and before they may be carried by the succeeding set of segments, so that the carriage 52 and knife 53 drop, thereby severing the strip 13. The rollers 58 are now engaged by the forward vertical surfaces of the succeeding pair of track segments 51, so that the carriage 52 is driven horizontally and caused to travel with the belt 49 and strip 13. During its travel the carriage is automatically raised again by inclined tracks 60 mounted on stationary frames 61, the tracks engaging rollers 62 carried by brackets 63 secured to the carriage 52. During the travel of the carriage 52 with the belt 49, the bars 54 will slide in the fittings 55 against a yielding force provided by compression springs 64. When the carriage 52 reaches an intermediate position wherein the rollers 58 are raised sufficiently to clear the driving surfaces of the track segments 51, the carriage 52 will be free for return to its initial or starting position, this being automatically accomplished by the compression springs 64, and during such return the carriage is maintained in raised position since the rollers 58 will be riding on the surface of the succeeding set of track segments 51. This sequence of operations is repeated at intervals as determined by the lengths of the track segments 51, the sharp edge of the knife 53 entering the spaces between the blocks 50 during shearing of the strip 13 to enable the knife to completely sever the strip. A platen 65 is provided underneath the conveyor belt 49 at the point where the cutting operations are performed to support the belt, and the blocks and tracks carried thereby. The initial or starting position of the carriage 52 may be adjusted by means of collars 66 carried by the bars 54 and secured thereto by means of set screws.

The structure illustrated in Figs. 5 and 6 is particularly adapted for use where light operations are to be performed on strip material which is comparatively soft, as for instance a strip of plastic, or on material of thin cross-section.

Variations and modifications may be made within the scope of this invention and portions of the improvements may be used without others.

I claim:

1. Apparatus for cutting a strip of plastic material into pieces of desired size as the latter is fed from a source of supply comprising conveying means for supporting and advancing the strip to feed the strip to and away from a cutting station; a cutter at the cutting station for cutting the strip supported by the conveying means into sections; means operable by the conveyor for automatically causing the cutter to move from a starting position to cut the strip; means for causing the cutter to travel with the cut section carried by the conveying means and in engagement therewith; means for withdrawing the cutter from the strip when the latter reaches a predetermined position in its travel; and means for returning the cutter to starting position ready for the next automatic operation.

2. Apparatus for performing operations on a strip of material of indefinite length emerging from a source of supply, including a conveyor for carrying the strip away from the supply; a tool for performing operations on the strip; a carrier for the tool, including a carriage mounted above the conveyor and movable both vertically and in the direction of conveyor movement; means operable by the conveyor for holding the carriage in a raised starting position and for dropping the carriage after the conveyor has moved a predetermined amount, so that the tool operates on the strip; means operative when the carriage is dropped for travelling the latter in the direction of conveyor movement; means for automatically raising the carriage during its travel with the conveyor, to an intermediate position wherein the tool no longer engages the strip, the carriage at said intermediate position ceasing to travel with the conveyor; and means for automatically returning the carriage to its starting position after its travel with the conveyor has ceased.

3. Apparatus for performing operations on a long strip of material of indefinite length emerging from a source of supply, including a conveyor for carrying the strip away from the supply; a tool for performing operations on the strip; a carrier for the tool, including a carriage mounted above the conveyor and movable both vertically and in the direction of conveyor movement; an arm connected to operate from the conveyor, for holding the carriage in a raised starting position, said arm operating in response to movement of the conveyor a predetermined amount to release the carriage so that it and the tool may drop to cause the latter to operate on the strip, the carriage when dropped being travelled by the conveyor in its direction of movement; means for automatically raising the carriage during its travel with the conveyor, to a position wherein it is no longer caused to travel with the conveyor; and means for automatically returning the carriage to its starting position after its travel with the conveyor has ceased.

4. Apparatus for cutting a long strip of material of indefinite length emerging from a source of supply, including a conveyor for carrying the strip away from the supply; a cutting tool; a carrier for the tool, including a carriage mounted above the conveyor and movable both vertically and in the direction of conveyor movement; means operable by the conveyor for holding the carriage in a raised starting position and for dropping the carriage after the conveyor has moved a predetermined amount so that the tool cuts the strip, said carriage when dropped being travelled in the direction of conveyor movement; means for automatically raising the carriage during its travel with the conveyor, to an intermediate position wherein the tool no longer engages the strip, the carriage at said intermediate position ceasing to travel with the conveyor; and means for automatically returning the carriage to its starting position after its travel with the conveyor has ceased.

5. Apparaus for performing repeated operations on a long strip of material of indefinite length emerging from a source of supply, including a continuous conveyor for carrying the strip away from the supply; a tool for performing operations on the strip; a carrier for the tool, including a carriage mounted above the conveyor and movable both vertically and in the direction of conveyor movement; a support for holding the carriage in a raised starting position; means carried by the conveyor for periodically engaging the support to cause operation of the latter during movement of the conveyor whereby the carriage is periodically dropped so that the tool carried thereby repeatedly operates on the strip, said carriage when dropped being travelled by the conveyor in its direction of movement; means for automatically raising the carriage each time it travels with the conveyor, to a position wherein it is no longer caused to travel; and means for automatically returning the carriage to its starting position each time its travel with the conveyor has ceased.

6. Apparatus for performing operations on a long strip of material of indefinite length emerging from a source of supply, including a conveyor for carrying the strip away from the supply; a plurality of tools for performing operations on the strip; a carrier mounting said tools for conjoint operation, said carrier including a carriage mounted above the conveyor and movable both vertically and in the direction of conveyor movement; means operable by the conveyor for holding the carriage in a raised starting position and for dropping the carriage after the conveyor has moved a predetermined amount, so that the tools operate on the strip, said carriage when dropped being travelled in the direction of conveyor movement; means for automatically raising the carriage during its travel with the conveyor to an intermediate position wherein the tools no longer engage the strip, the carriage at said intermediate position ceasing to travel with the conveyor; and means for automatically returning the carriage to its starting position after its travel with the conveyor has ceased.

7. Apparatus for performing operations on a long strip of material of indefinite length emerging from a source of supply, including a conveyor for carrying the strip away from the supply; a punch and a knife; a carrier mounting said punch and knife for conjoint operation, said carrier including a carriage mounted above the conveyor and movable both vertically and in the direction of conveyor movement; means operated by the conveyor for holding the carriage in a raised starting position and for dropping the carriage after the conveyor has moved a predetermined amount, so that the punch and knife operate on the strip, said carriage when dropped being travelled in the direction of conveyor movement; means for automatically raising the carriage during its travel with the conveyor to an intermediate position wherein the punch and knife no longer engage the strip, the carriage at said intermediate position ceasing to travel with the conveyor; and means for automatically returning the carriage to its starting position after its travel with the conveyor has ceased.

8. Apparatus for cutting into sections a long strip of material of indefinite length emerging from a strip-fabricating machine, including a conveyor for carrying the strip away from the machine; a knife for severing the strip; a carrier for the knife, including a carriage mounted above the conveyor and movable both vertically and in the direction of conveyor movement; a latch for holding the carriage in a raised starting position; an arm mounted on the conveyor for tripping the latch when the conveyor has moved a predetermined amount to allow the carriage to drop so that the knife carried thereby severs the strip; means engaging the arm on the conveyor for causing the carriage when in dropped position to travel with the conveyor; a cam and roller for automatically raising the carriage during its travel with the conveyor, to a position wherein the travel-causing means is disengaged from the arm on the conveyor; and means including a coil spring engaging the carriage for automatically returning the latter to its starting position after the travel-causing means has been disengaged.

9. Apparatus for performing operations on a long strip of material of indefinite length emerging from a source of supply, including a conveyor for carrying the strip away from the supply; a tool for performing operations on the strip; a carrier for the tool, including a carriage mounted above the conveyor and movable both vertically and in the direction of conveyor movement; a latch for holding the carriage in a raised starting position; means movable with the conveyor for tripping the latch to allow the carriage to drop so that the tool carried thereby operates on the strip; means for causing the carriage when in dropped position to travel with the conveyor; means for automatically raising the carriage during its travel with the conveyor, to a position wherein it is no longer caused to travel with the conveyor; and means for automatically returning the carriage to its starting position after its travel with the conveyor has ceased.

10. Apparatus for severing in a single operation a plurality of sections from a long strip of material of indefinite length emerging from a source of supply, including a continuous conveyor for carrying the strip away from the supply; a plurality of knives; a carrier mounting the knives for conjoint operation, said carrier including a carriage mounted above the conveyor and movable both vertically and in the direction of conveyor movement; means operable by the conveyor for holding the carriage in a raised starting position and for dropping the carriage after the conveyor has moved a predetermined amount, so that the knives sever sections of the strip, said carriage when dropped being travelled in the direction of conveyor movement; means for automatically raising the carriage during its travel with the conveyor to an intermediate position wherein the knives no longer engage the strip, the carriage at said intermediate position ceasing to travel with the conveyor; and means for automatically returning the carriage to its starting position after its travel with the conveyor has ceased.

11. Apparatus for performing operations on a long strip of material of indefinite length emerging from a source of supply, including a conveyor for carrying the strip away from the supply; a tool for performing operations on the strip; a carrier for the tool, including a carriage mounted above the conveyor and movable both vertically and in the direction of conveyor movement; an operating member attached to the carriage; a cam mounted to move with the conveyor, for engaging the operating member to hold the carriage in a raised starting position, said cam being shaped to permit the carriage to drop after the conveyor has moved an extent so that the tool operates on the strip; means engaging the said operating member for causing the carriage when dropped to travel with the conveyor; means for automatically raising the carriage during its travel with the conveyor, to a position wherein it is no longer caused to travel with the conveyor; and means for automatically returning the carriage to its starting position after its travel with the conveyor has ceased.

12. Apparatus for performing repeated operations on a long strip of material of indefinite length emerging from a source of supply, including a continuous conveyor for carrying the strip away from the supply; a tool for performing operations on the strip; a carrier for the tool, including a carriage mounted above the conveyor and movable both vertically, and horizontally in the direction of conveyor movement; an arm fastened to the carriage for controlling its movement; a plurality of aligned tracks carried by the conveyor for consecutively engaging the arm during operation of the conveyor to hold the carriage in raised position, said tracks at their ends being spaced so that the carriage may drop at said spaces to enable the tool carried thereby to operate on the strip, and said tracks having driving surfaces for engaging the arm when the carriage is in dropped position to cause the latter to travel with the conveyor; means for automatically raising the carriage during its travel with the conveyor, to a position wherein the arm no longer engages a driving surface, so that the carriage is released and free for horizontal return movement; and means for automatically returning the carriage when released to its raised starting position, the carriage being prevented from dropping during such return by engagement of the arm with one of said tracks.

13. The invention as defined in claim 4 in which the conveyor has blocks on which the strip is carried, the blocks being spaced apart and arranged so that the cutting tool in cutting and passing through the strip may enter a space between two adjacent blocks while the strip adjacent its cut edges is being supported by the blocks.

14. The invention as defined in claim 4 in which there is a shear bar extending transversely over the conveyor at the point where the cutting tool cuts the strip, the latter passing over the shear bar so that it is supported thereby for cutting.

15. Apparatus for performing operations on a long strip of material of indefinite length emerging from a source of supply, including a conveyor belt for carrying the strip away from the supply; a plurality of blocks secured to the belt in spaced relation, for supporting the strip; a tool for operating on the strip; means for operatively mounting the tool above the strip, said means comprising a tool carrier, a slide connected to the carrier, and a pivot connected to the slide whereby the tool may be moved toward the strip to engage same, and may be travelled with the strip during such engagement; tracks on the conveyor belt for engaging the tool carrier to support the latter and tool in a raised starting position during a part of the conveyor belt movement, said tracks being shaped and spaced so that the carrier may be dropped and travelled with the belt after a predetermined movement of the latter, to cause the tool to operate on the strip while same is travelling; means including an inclined track for raising the tool carrier during its travel with the belt, to disengage the tool from the strip, the tracks on the belt again supporting the carrier when it reaches a predetermined raised position; and a spring connected with the slide for returning the carriage to its starting position after it has reached said predetermined raised position.

16. The invention as defined in claim 15 in which the tool comprises a knife for severing the strip, the knife extending into the spaces between the belt blocks when the strip is severed, and in which corresponding tracks and blocks on the belt are respectively secured together in predetermined relation so that an accurately located space exists under the strip for the knife edge each time the tool carrier is dropped.

17. Apparatus for performing operations on a long strip of material of indefinite length emerging from a source of supply, including a conveyor for carrying the strip away from the supply at a predetermined speed; a tool for performing operations on the strip; a carrier for the tool, including a carriage mounted above the conveyor and movable both vertically and in the direction of conveyor movement; means operable by the conveyor for holding the carriage in a raised starting position and for dropping the carriage after the conveyor has moved a predetermined amount, so that the tool operates on the strip; means independent of the conveyor for causing the carriage when dropped to travel with the conveyor at said predetermined speed; means for automatically raising the carriage during its travel with the conveyor, to an ntermediate position wherein the tool no longer engages the strip of material; means for automatically rendering inoperative the carriage-travelling means when the carriage reaches said intermediate position; and means for automatically returning the carriage to its starting position after the carriage-travelling means has been rendered inoperative.

18. The invention as defined in claim 17 in which the means for causing the carriage when dropped to travel with the conveyor comprises a source of motive power, variable gearing between said source and the carriage, a clutch connected with said gearing and means for causing the clutch to be engaged in response to dropping of the carriage, and in which the means for rendering inoperative the carriage-travelling means includes means for causing the said clutch to be disengaged.

19. The invention as defined in claim 2 in which there are means including parallel slides on each side of the conveyor, for mounting the carriage for travel with the conveyor, and in which there is gearing, including racks and pinions, for causing simultaneous movement of the slides to prevent their binding.

REX L. HALLMAN.

REFERENCES CITED

The following references are of record in the file of this patent:

UNITED STATES PATENTS

| Number | Name | Date |
| --- | --- | --- |
| 2,294,020 | Breth et al. | Aug. 25, 1942 |
| 2,278,786 | Johnston | Apr. 7, 1942 |
| 2,112,443 | Martoccio | Mar. 29, 1938 |
| 2,301,236 | Yoder | Nov. 10, 1942 |